United States Patent
Hensley et al.

(10) Patent No.: US 9,211,830 B1
(45) Date of Patent: Dec. 15, 2015

(54) LOW CENTER OF GRAVITY FEEDING TRANSPORT TRAILER

(71) Applicant: Hensley Fabricating & Equipment Co Inc, Tippecanoe, IN (US)

(72) Inventors: Ryan Hensley, Tippecanoe, IN (US); Travis Hensley, Syracuse, IN (US); Gregg Hensley, Tippecanoe, IN (US); Jim Poisel, Argos, IN (US)

(73) Assignee: Hensley Fabricating & Equipment Co., Inc., Tippecanoe, IN (US)

( * ) Notice: Subject to any disclaimer, the term of this patent is extended or adjusted under 35 U.S.C. 154(b) by 94 days.

(21) Appl. No.: 14/184,435

(22) Filed: Feb. 19, 2014

(51) Int. Cl.
*B60P 1/40* (2006.01)
*B60P 1/36* (2006.01)
*B60P 1/42* (2006.01)

(52) U.S. Cl.
CPC ... *B60P 1/36* (2013.01); *B60P 1/40* (2013.01); *B60P 1/42* (2013.01)

(58) Field of Classification Search
CPC ................. B60P 1/36; B60P 1/38; B60P 1/42
USPC ........................... 414/526, 527, 528; 280/837
See application file for complete search history.

(56) References Cited

U.S. PATENT DOCUMENTS

| | | | | |
|---|---|---|---|---|
| 2,601,608 A * | 6/1952 | Hansen | ......................... | 222/413 |
| 3,794,194 A * | 2/1974 | Holland | ........................ | 414/528 |
| 3,917,084 A * | 11/1975 | Swisher et al. | ............... | 414/523 |
| 4,005,790 A * | 2/1977 | Holland | ........................ | 414/528 |
| 5,085,025 A * | 2/1992 | Gaddis | .......................... | 296/204 |
| 5,797,480 A * | 8/1998 | Gaddis et al. | ................. | 198/672 |
| 6,447,238 B1 * | 9/2002 | Brown | .......................... | 414/502 |
| 6,623,234 B1 * | 9/2003 | Herring et al. | ................ | 414/528 |
| 6,814,532 B1 * | 11/2004 | Thompson et al. | ........... | 414/502 |
| 7,988,403 B2 * | 8/2011 | Ricketts | ........................ | 414/505 |
| 9,039,340 B2 * | 5/2015 | Van Mill et al. | ............... | 414/526 |
| 2004/0184905 A1 * | 9/2004 | Kinzenbaw et al. | .......... | 414/526 |
| 2014/0232177 A1 * | 8/2014 | Power | .......................... | 301/131 |

* cited by examiner

*Primary Examiner* — Kaitlin Joerger
(74) *Attorney, Agent, or Firm* — Botkin & Hall, LLP

(57) ABSTRACT

A feed transport trailer with a low center of gravity is particularly useful for transportation of particulate material. A storage vessel is attached to a frame assembly which is lower than the attachment point on a tractor. The storage vessel has a central low conveyor mechanism that extends to the rear of the trailer and is used for unloading. The conveyor extends beyond rear axles that have center depressed areas to allow the vessel and conveyor to be located close to the ground.

14 Claims, 17 Drawing Sheets

LOW CENTER OF GRAVITY FEEDING TRANSPORT TRAILER

CROSS REFERENCE TO RELATED APPLICATIONS

This application claims the benefit of U.S. Provisional Application No. 50/548,813, filed Feb. 19, 2013, the disclosure of which is hereby incorporated by reference.

BACKGROUND OF THE INVENTION

This present disclosure relates to feed transportation trailers, specifically ones pulled by semi tractors and are used for dispensing feed through an auger mechanism mounted underneath the storage portion of the trailer. Feed transportation trailers are typically loaded through an opening at the top, and unloaded through a screw drive mechanism located in the bottom. This screw drive is usually referred to as an auger. The feed is driven through various augers mounted in a series of tubes that carry the feed to a storage facility or another transportation device. For the trailer to empty fully, the bottom of the storage area is tapered so the feed naturally falls down with gravity into the auger in the bottom. A fully loaded feed trailer can be very heavy, and due to the tapered bottom, a majority of the weight is located high on the trailer. A high center of gravity is undesirable on a transportation vehicle, as certain driving maneuvers create instability, rollover accidents, and potential loss of life. Some manufacturers have a smaller diameter auger that is directly underneath the feed storage area then add an additional auger section that travels up at an angle and therefore avoids the rear trailer axle. It is therefore desirable to make a trailer with the lowest center of gravity while still holding a maximum amount of feed. It is also desirable to have an overall lower trailer for low clearance areas, such as low bridges or overhanging tree limbs, or feed mills with low loadout heights.

SUMMARY OF THE INVENTION

The present disclosure describes a feed transport trailer that has a lower center of gravity. The trailer has an opening at the top of a storage vessel for loading feed and a centrally located auger at the bottom of the vessel for unloading. The auger travels down the center bottom of the vessel and continues past the axles toward the rear of the trailer. The necessity for a low center of gravity and a simple auger mechanism is accomplished by having the auger pass through the centerline of the axle spindles. The use of rear axles with a center depression allows additional space for a central auger at the bottom of the storage to be as low as possible.

BRIEF DESCRIPTION OF THE DRAWINGS

A preferred embodiment of this invention has been chosen wherein.

DESCRIPTION OF THE PREFERRED EMBODIMENT

Figure 1:
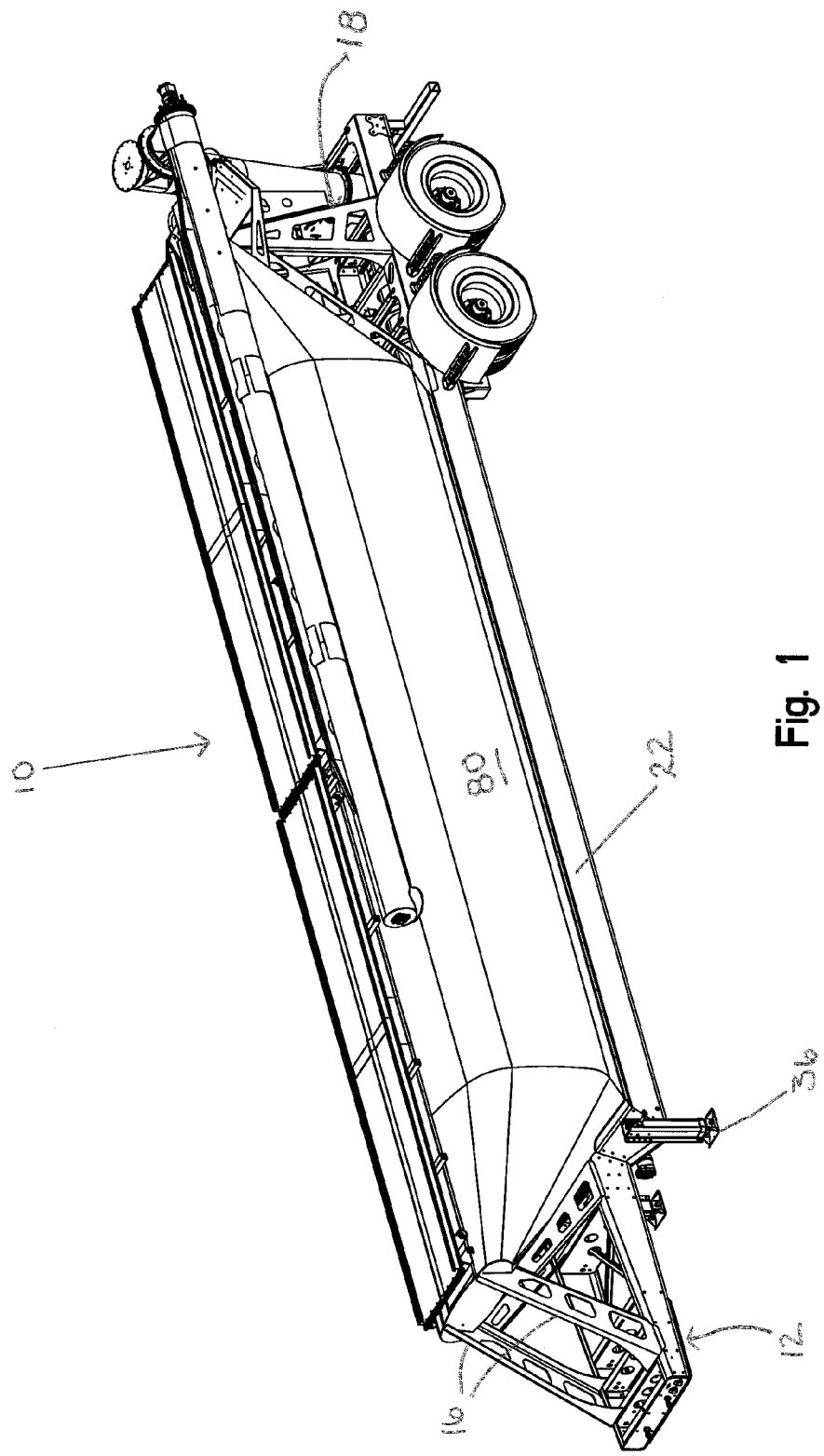
FIG. 1 is an overall isometric left view of the trailer.

A feed transport trailer 10 is comprised of a front attachment point, commonly called a kingpin 12 for connecting up to a tractor. The kingpin 12 is attached to a platform 14, FIG. 4. This assembly is called the gooseneck section, which is attached to several structural members 16 and attached to a frame that runs the length of the trailer. The frame has parallel rails 22 extending longitudinally for the length of the trailer 10. The frame rails 22 may be made up of I-beams, tubes, or channel members as is well known in the art. Between the gooseneck section and a rearmost section of the trailer, the frame rails form the lowermost support for the vessel. The rear of the trailer 10 is held up with center drop axle assemblies 20, FIG. 7 which are attached to frame 22. Attached near the front of the trailer are telescoping feet, commonly called dollies, indicated at 36. The dollies 36 are used to adjust the front of the trailer up or down for affixing the gooseneck to a tractor or for storing the trailer when it is not hooked up to a tractor. As is well known in the art, the dollies 36 are spaced to maintain stability when the trailer is being supported by the feet while being stored, attached, or detached from a tractor. It is also possible to build the frame and the vessel as one part, such that the frame and the vessel are one integral part. The gooseneck section and the rear axles would be attached directly to the vessel.

Figure 12:
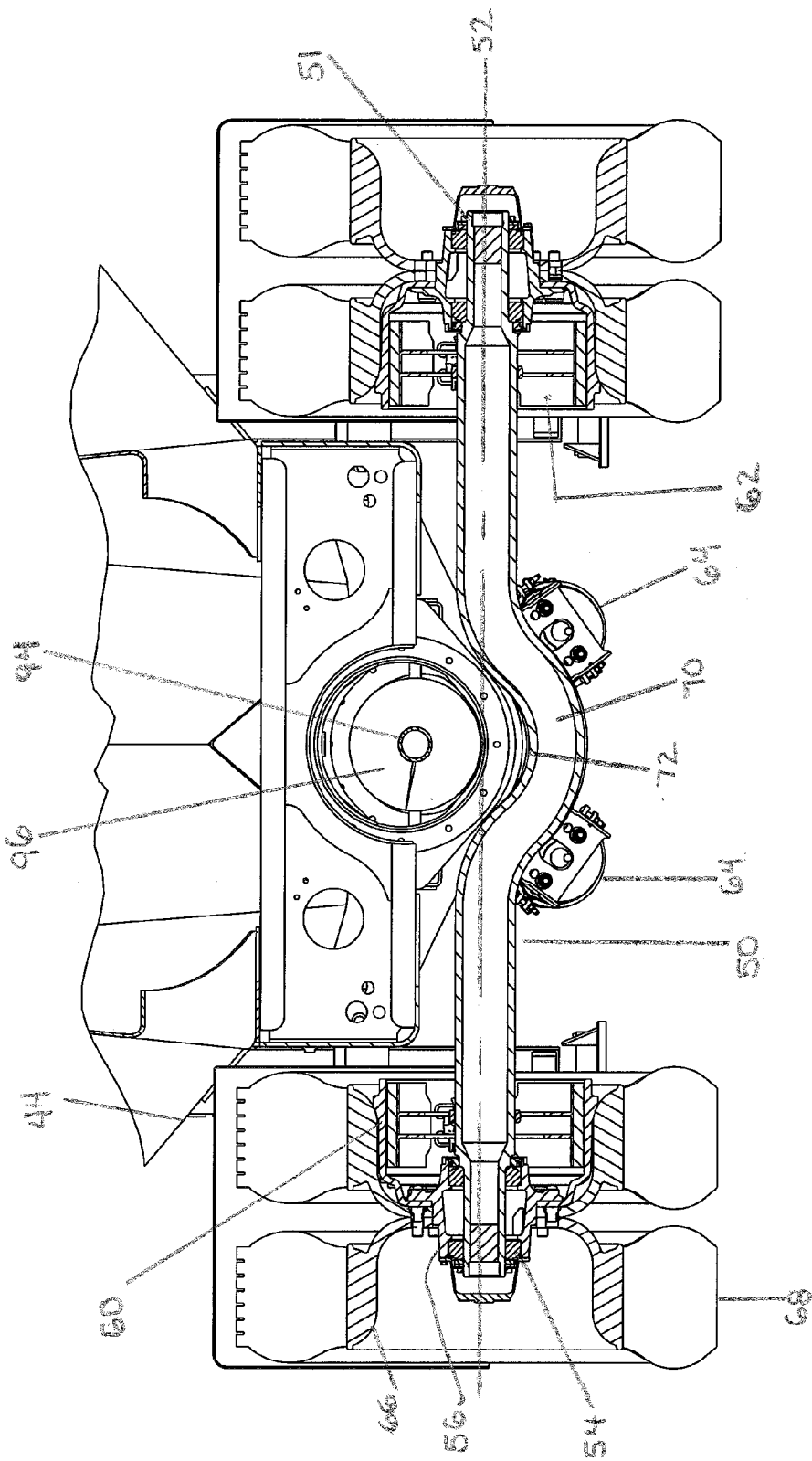
FIG. 12 is a section view of the trailer axle taken about line 6a-6a near the end of the trailer.
Figure 13:
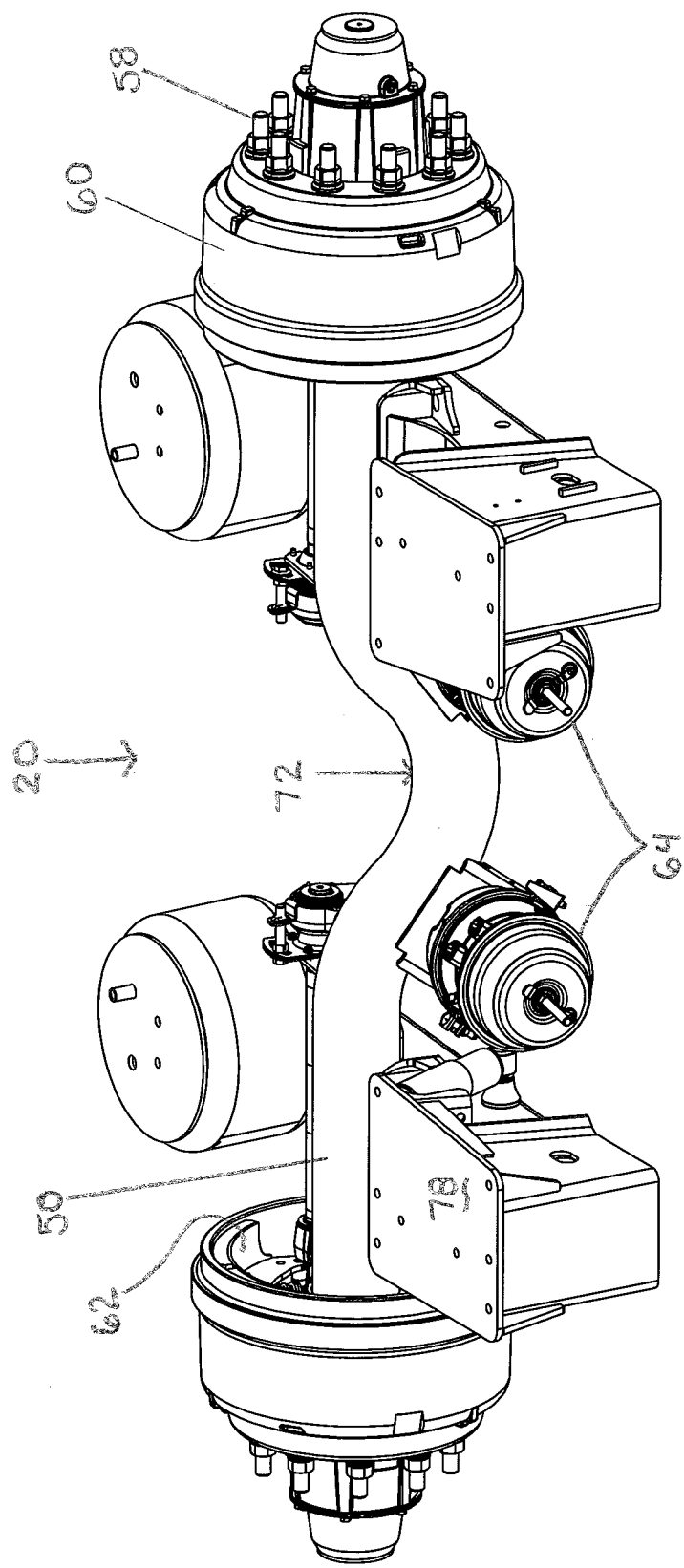
FIG. 13 is an isometric view of the trailer axle assembly from the top.
Figure 14:
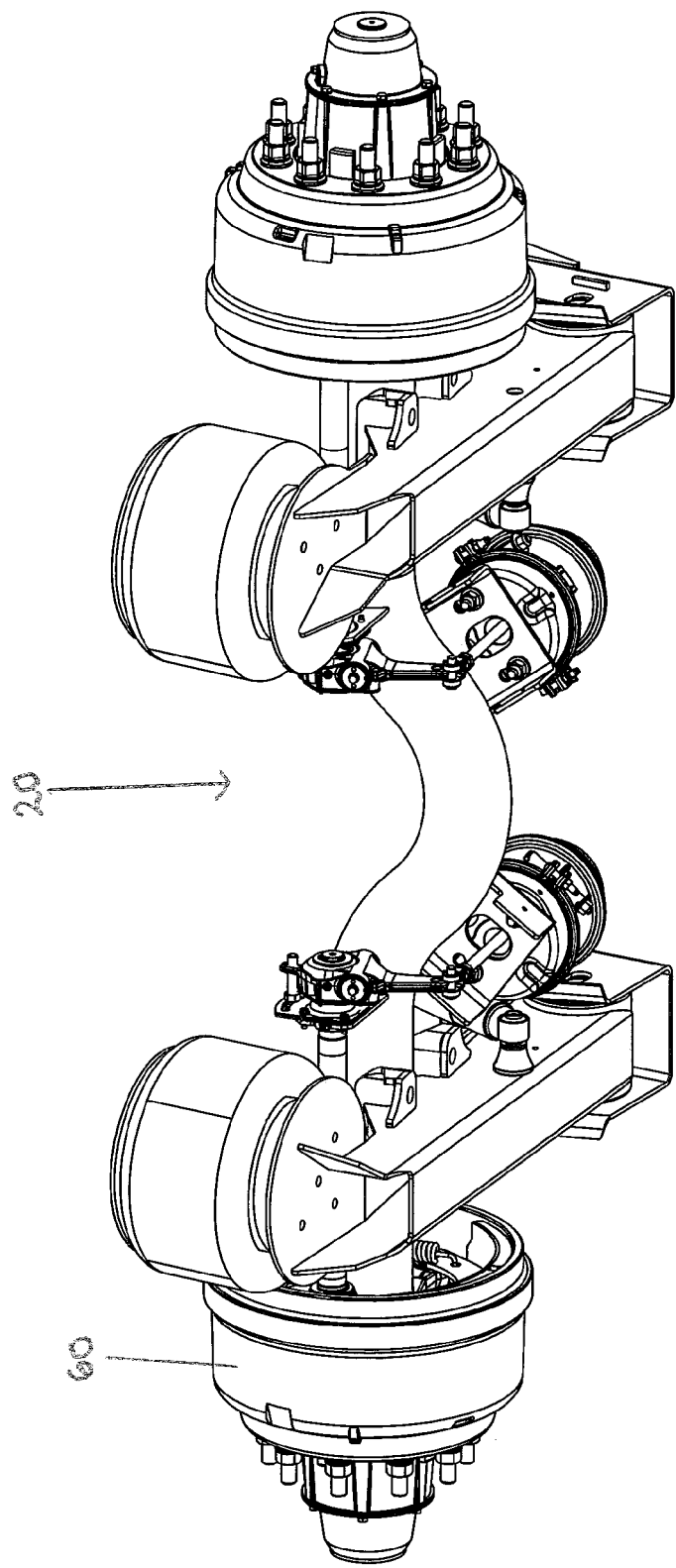
FIG. 14 is an isometric view of the trailer axle assembly from the bottom.

The axle assemblies 20 are comprised of a continuous axle tube 50, FIG. 12 with spindles 51 on both ends. On the spindles 51, bearings 54 are mounted, wheel hubs 56 receive bearings 54 and contain threaded studs 58, FIG. 13, brake drums 60 brake pads 62 and an air pressure engagement mechanism 64, FIG. 12 for the brakes. Wheels 66 are mounted to wheel hubs and are held on with lug nuts onto studs that are captured in the wheel hub as is well known in the art. A brake drum is located between the hub and wheel. Tires 68 are mounted to the wheels, as is well known in the art. The bearings 54, hubs 56, drums 60, wheels 66, and tires 68 are all coaxial. The axle tube 50 has a depression 70 roughly in the center point between the spindles. This type of axle is commonly referred to as a center drop axle. This depression 70 allows the upper surface 72 of the axle tube to be lower than the central axis 52 of the spindles 51. The axle is mounted to the frame 22 through a conventional mounting suspension system 78 as is well known in the art.

Figure 2:
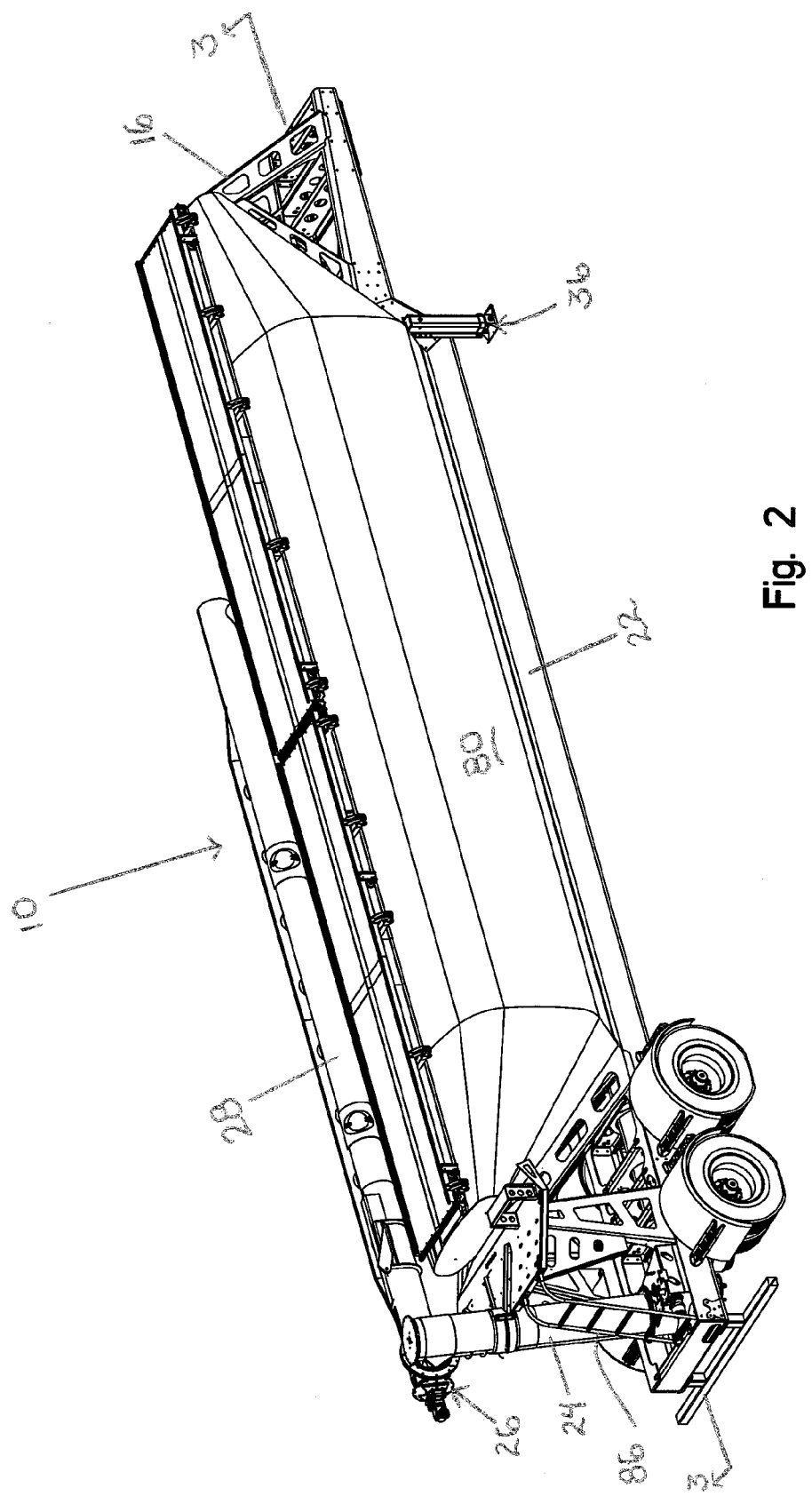
FIG. 2 is an overall isometric right view of the trailer shown in FIG. 1.
Figure 3:
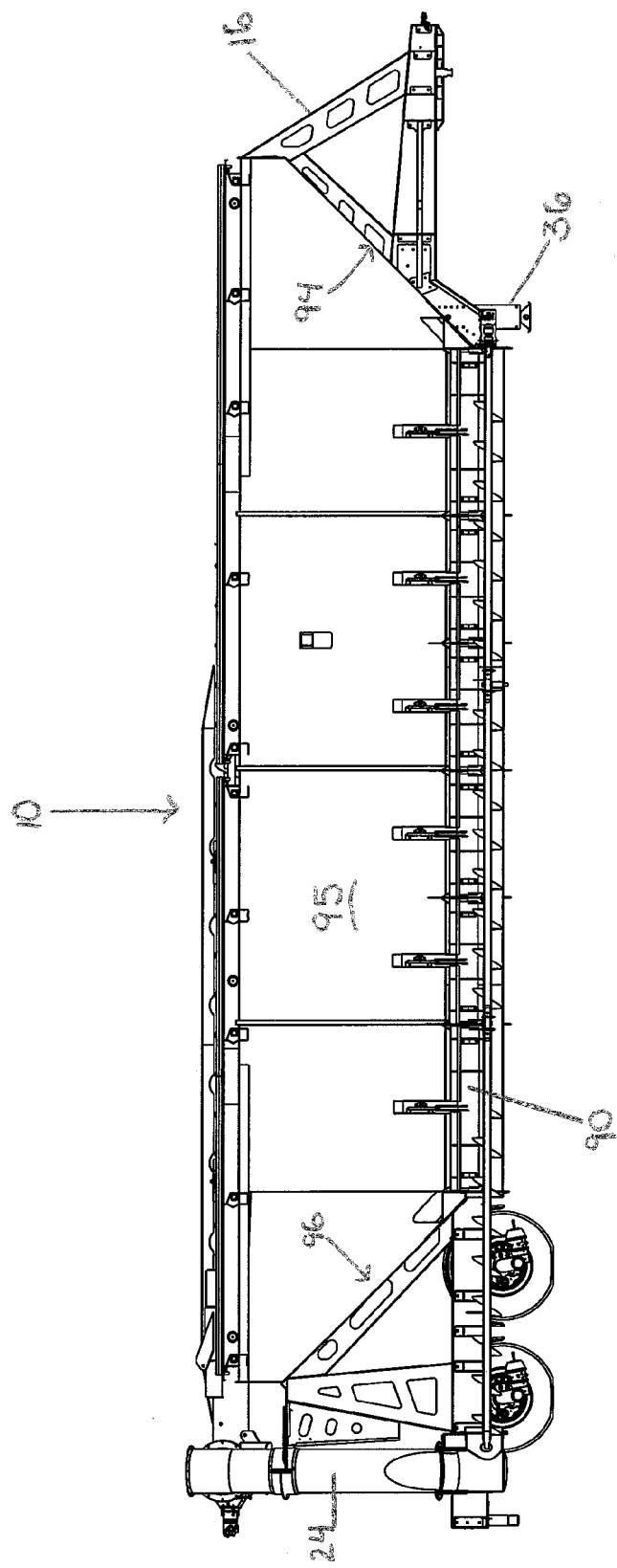
FIG. 3 is a sectional view about line 3-3 in FIG. 2.
Figure 4:
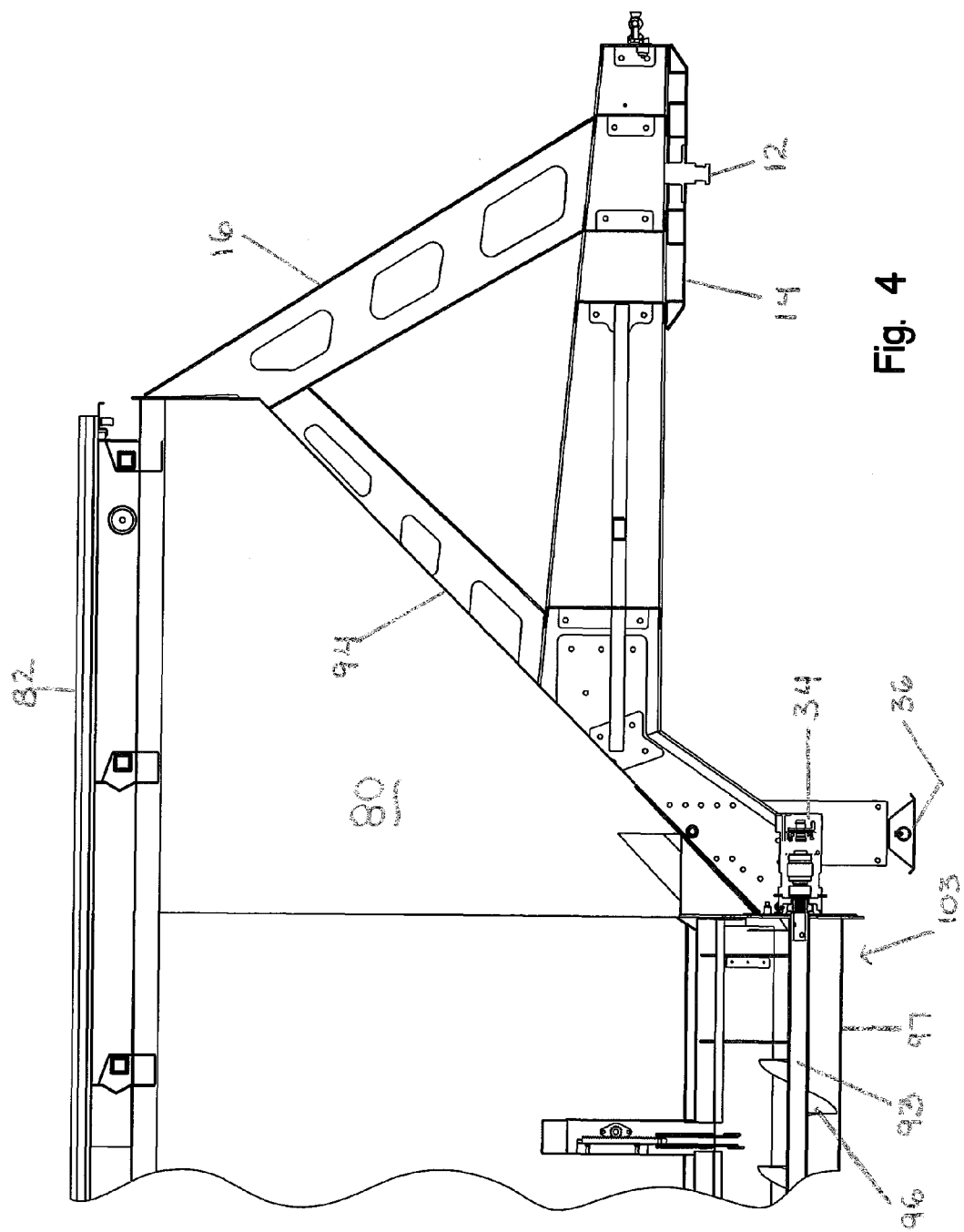
FIG. 4 is a sectional view taken about line 3-3 near the front end of the trailer.
Figure 5:
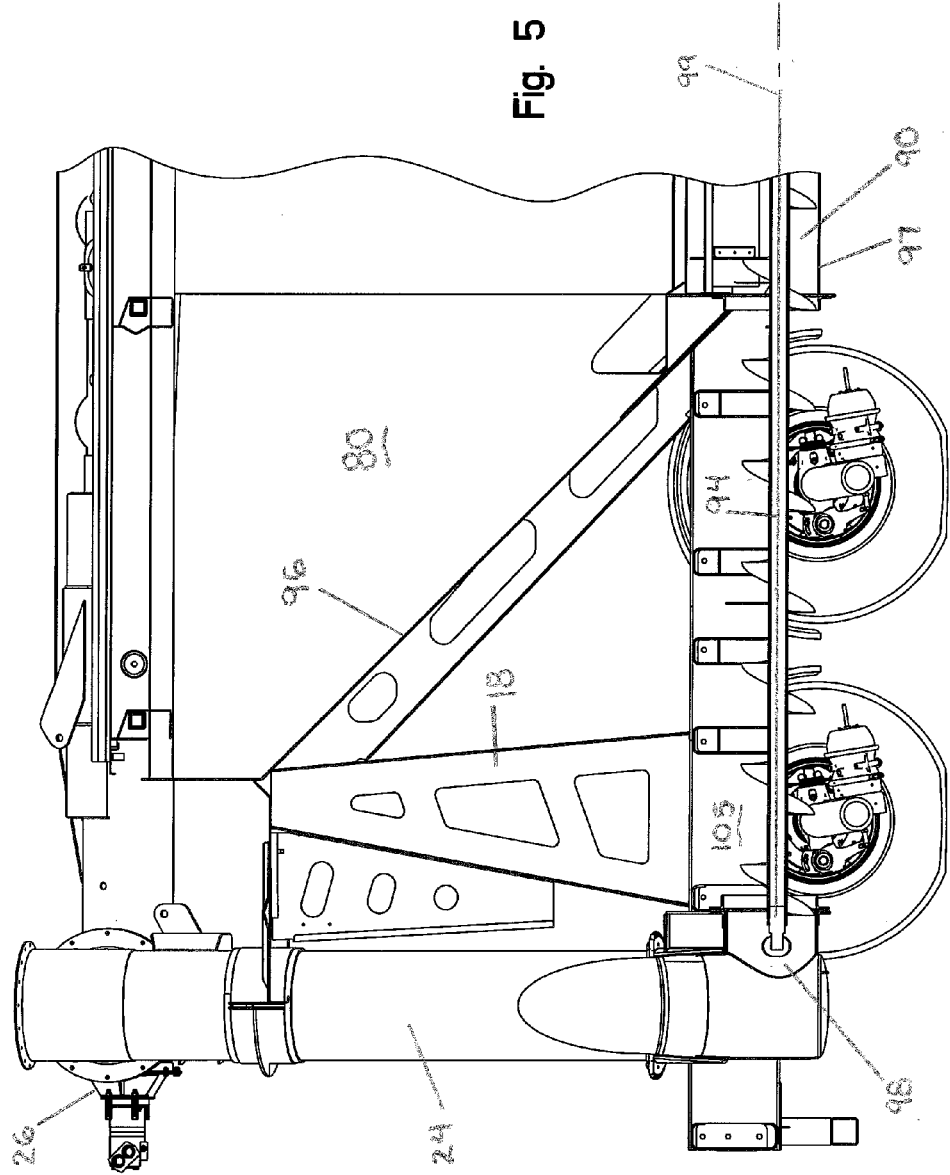
FIG. 5 is a sectional view taken about line 3-3 near the rear end of the trailer.
Figure 6:
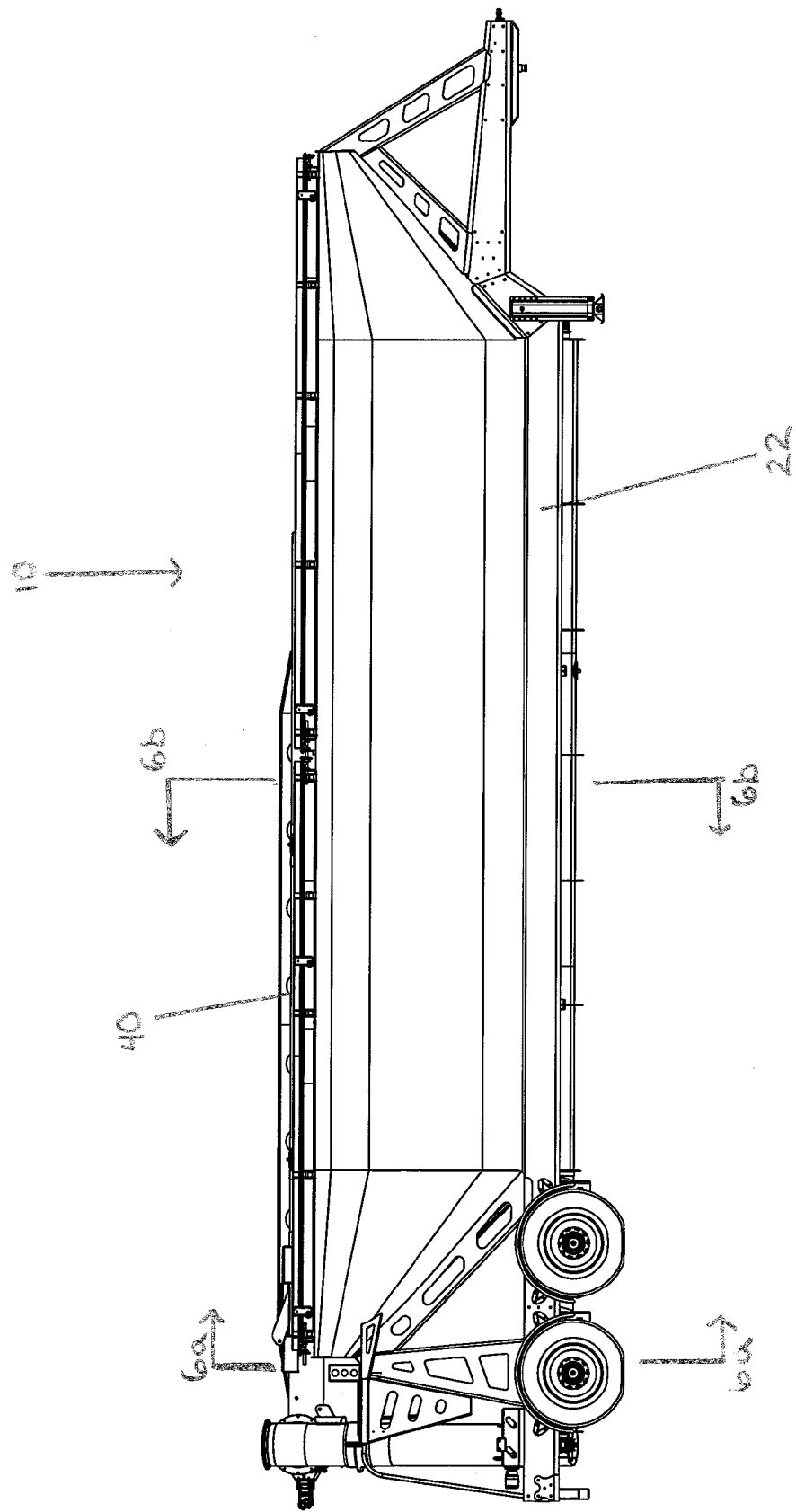
FIG. 6 is a side view of the trailer shown in FIG. 1.
Figure 7:
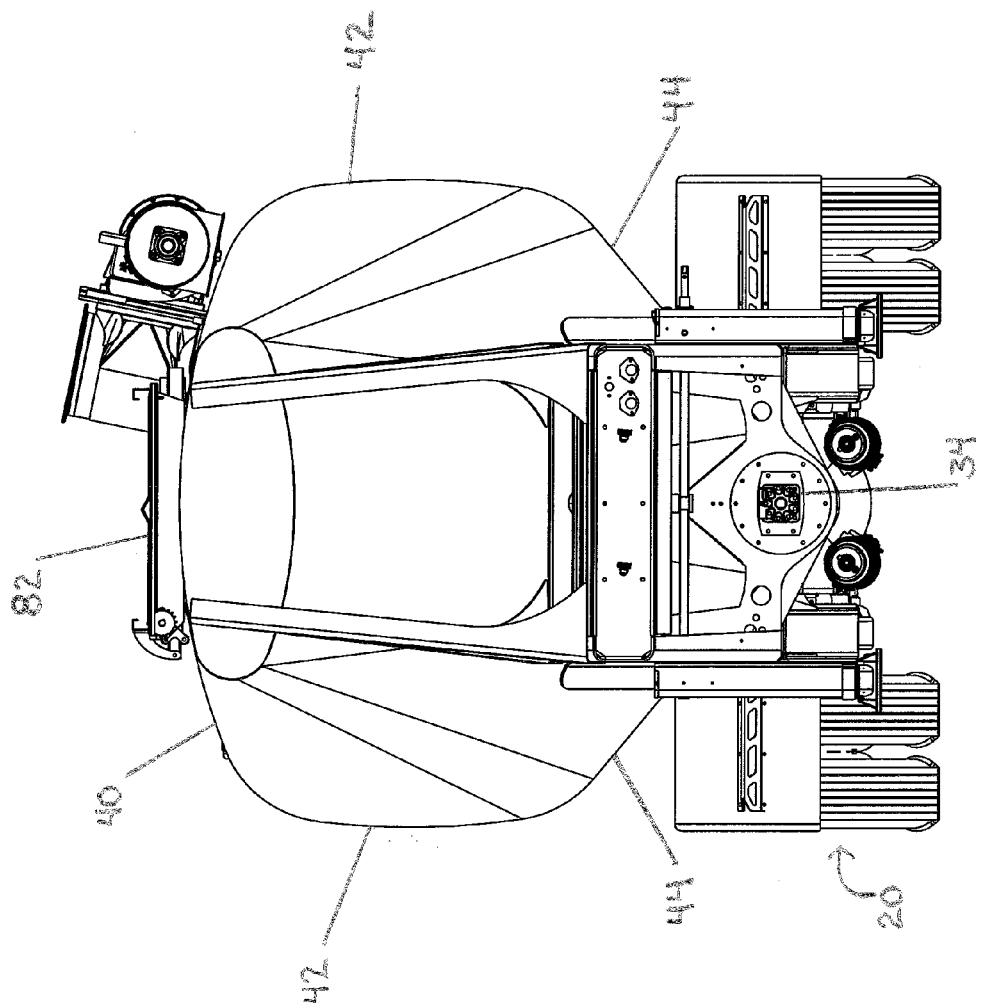
FIG. 7 is a front view of the trailer shown in FIG. 1.
Figure 9:
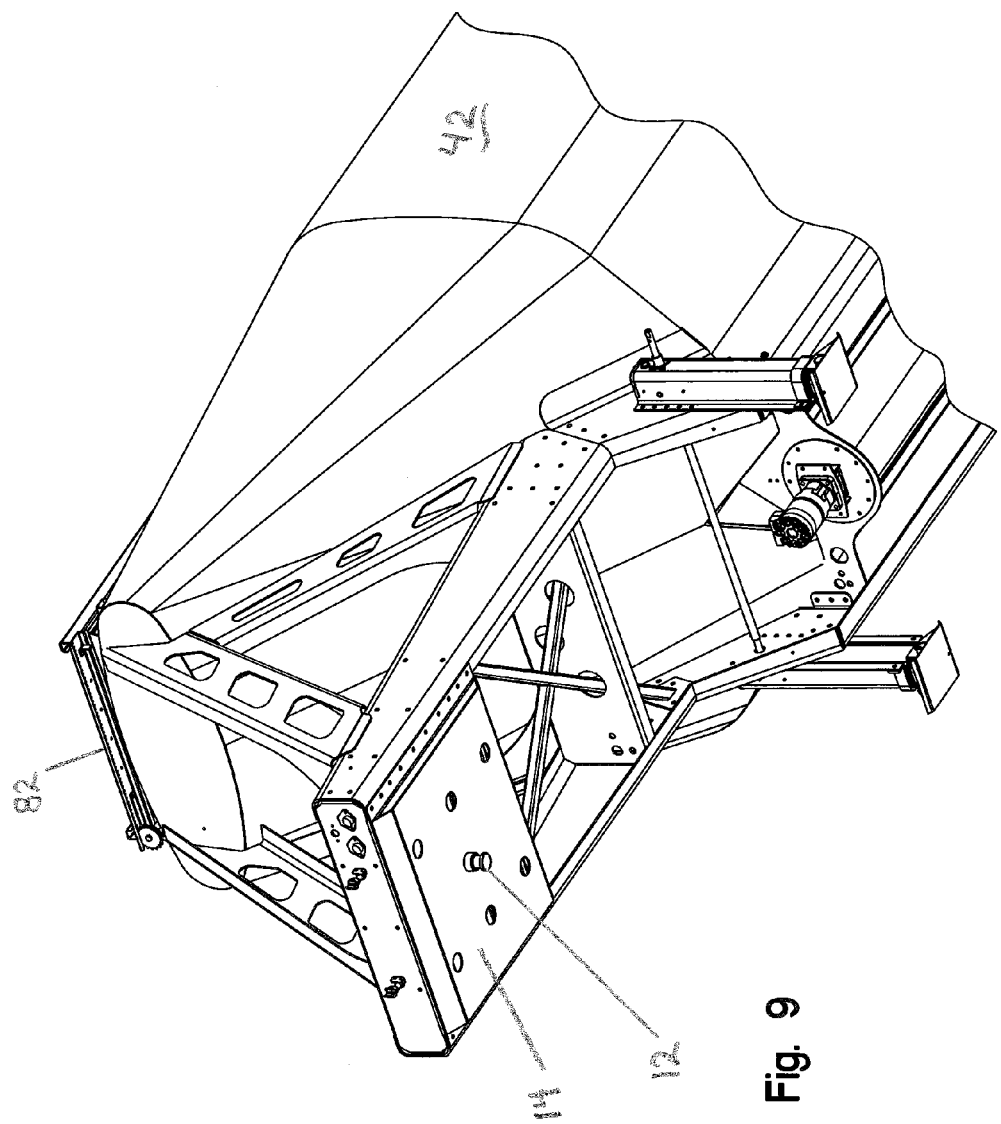
FIG. 9 is an isometric view under the front section of the trailer.
Figure 15:
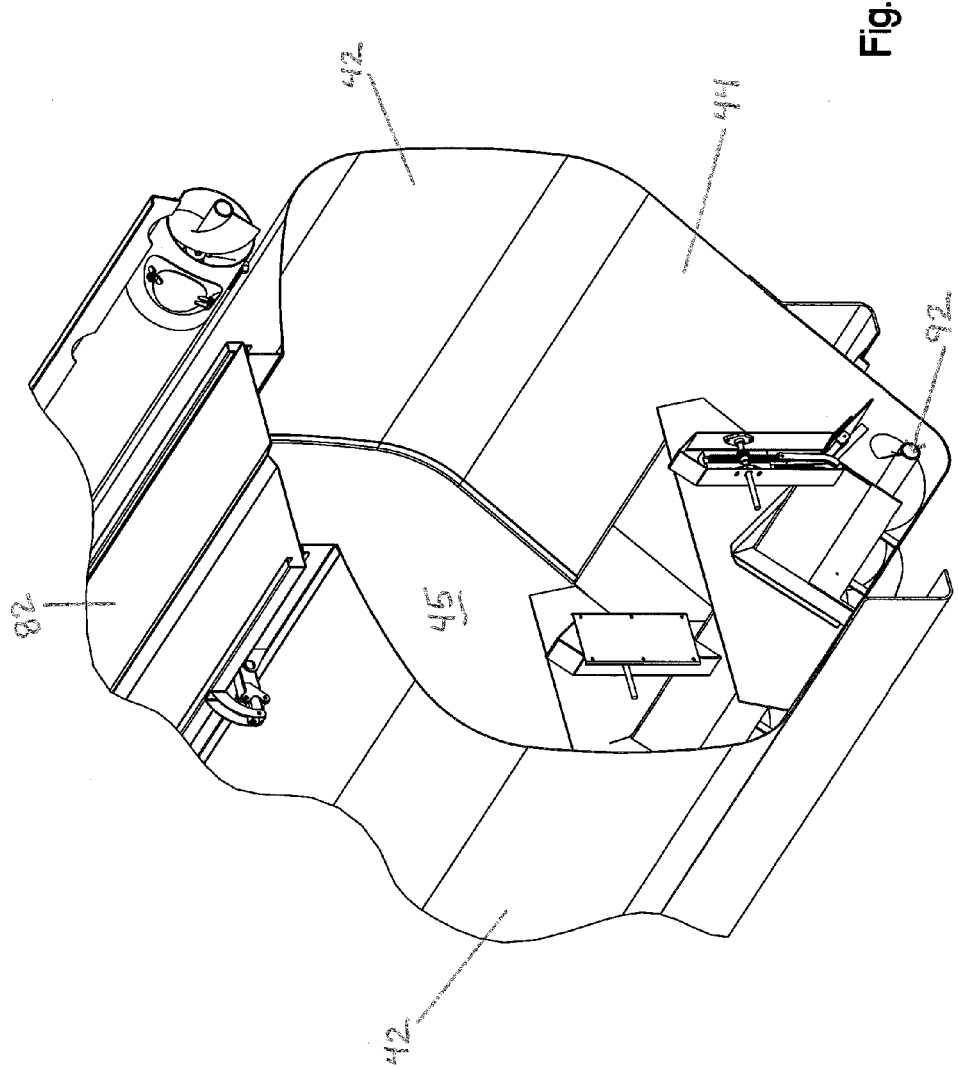
FIG. 15 is an isometric section view about line 6b-6b near the center of the trailer.
Figure 16:
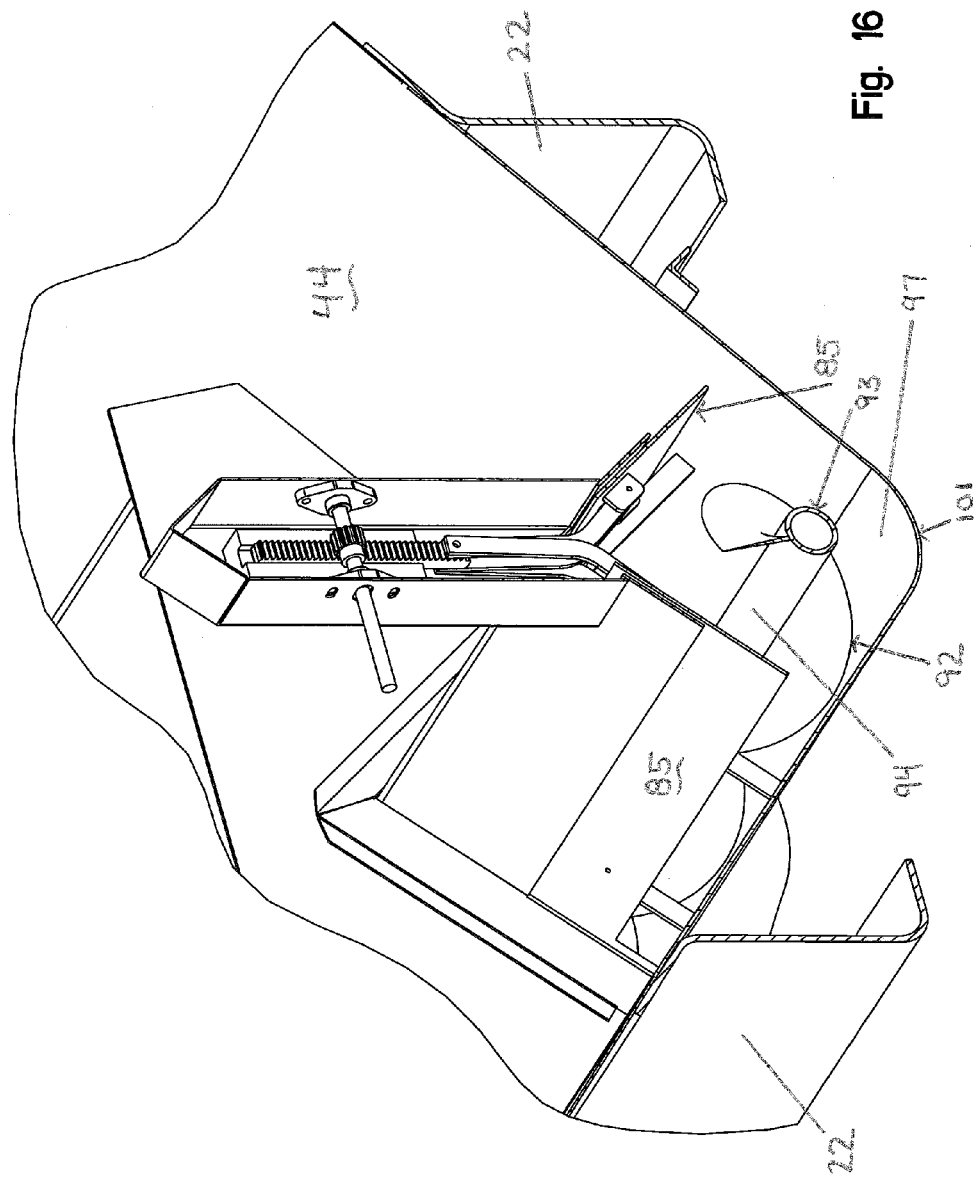
FIG. 16 is an isometric partial section view about line 6b-6b near the center of the trailer.
Figure 17:
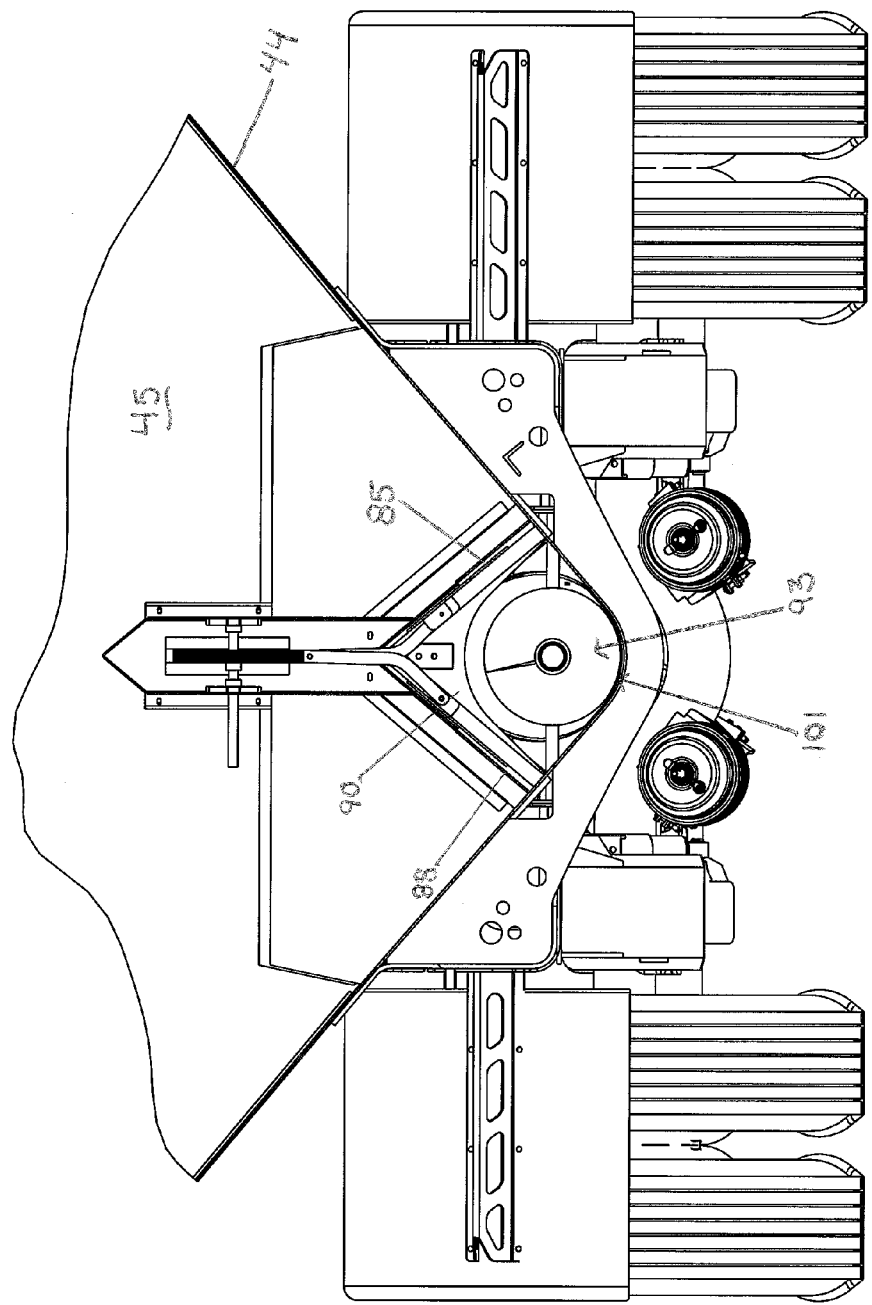
FIG. 17 is a section view of the trailer vessel and auger about line 6b-6b near the center of the trailer.

Mounted to the frame 22 is a storage vessel 80 that is designed to hold loose material. The loose material could be anything that would naturally flow down a sloped surface. Feed or other loose particulate is stored in the storage vessel section 80, The vessel is supported in the front by support frame members 16 and in the rear by additional support frame members 18. The length of the vessel is supported by the frame rails 22. The storage vessel 80 has a cross sectional shape that has a top 40 and sides 42 as shown in FIG. 7. The top and sides can be curved to reduce stress and maximize storage volume. The corners where the top 40 and sides 42 meet can also be curved. The storage vessel cross-sectional shape can also be mostly circular. The top 40 has a moveable door 82, FIG. 7 and FIG. 9 that reveals an opening where material can be loaded as is well known in the art. The top also can contain a walkway for inspecting the fill level of the vessel. This opening is accessible via a stairway 86, FIG. 2 that is mounted in close proximity to rear supports 18. The bottom portion is comprised of two angled sides 44, FIG. 17 that form a U-shape which meets in the center where there is an opening 88 where loose particulate can fall into a cavity 90 at the bottommost part of the vessel. The vessel can be made up of separate compartments with separate openings at the top for holding a variety of different materials. Compartments can be separated by walls 45 extending from the top wall 40 to the bottom 44 of the vessel. Each compartment could have a separate gate 85 at the bottom where the material in each compartment could be separated or connected to a conveyor mechanism at the bottommost portion of the vessel. The length of the vessel at the top is longer than the bottom. The width of the vessel is wider at the top than the width at the bottom. The slope of the angled sides 44 is such that all or nearly all material falls past a moveable gate 85 into a conveyor cavity that contains a conveyor 92, FIG. 16. The vessel 80 has multiple chambers 95, FIG. 3 that all feed the conveyor as shown in FIG. 4. The conveyor may be a belt, air, or auger conveyor. The trailer 10 shown in FIG. 3 has an auger conveyor 92 as shown in FIG. 15. The front and rear of the vessel are also sloped towards the bottom 94, 96, FIG. 3 such that all surfaces on the bottom are angled to gravity feed material towards the conveyor cavity 90 in the vessel. The auger conveyor 92 as shown in FIG. 16 has an auger 93 with a shaft 94 having a continuous spiral 96 affixed to the shaft 99. The spiral 96 extends outwardly from the central axis 99 of the auger 93 and travels continuously from one end to the other. The auger 93 is rotatably held in a housing 97 having an auger cavity 90. The housing 97 is typically made of metal or other material that is durable enough to be used for transporting agricultural product. The housing has an outer surface with the lowest portion 101 that is the bottom of the conveyor 92. The pitch of the spiral is such that material can be driven along the auger cavity 90 by rotating the auger 93. The auger is rotated by a motor 34 affixed to one end of the auger 93. The cavity 90 that surrounds the auger within the housing 97 is mostly U-shaped on the bottom with a gate 85 at the top that, when opened, passes material into the cavity that falls down the angled sides. The auger cavity 90 extends along the length of the bottom of the vessel 80 and continues past the rearmost portion of the vessel. The auger conveyor 92 has a front end 103 FIG. 4, located forward of the axles 20 near the front of the trailer 10 as shown in FIG. 4. The auger conveyor 92 has a rear end 105 located rearward of the axles in a longitudinal direction as is shown in FIG. 5. This allows an auger to drive particulate from the storage vessel 80 down along the axis of the auger 93. The auger 93 is one continuous member along the entire length of the auger cavity 90. The auger cavity 90 extends past the axle tube 50 along the length of the trailer and also protrudes through the central axis of the spindles 52, the material exits 98 FIG. 5, the auger cavity behind both axles 20. The depression 70 in the center of the axle tube 50 creates space for the auger cavity 90 to extend further to the rear of the trailer and reduces the height that the auger needs to be above the ground when the trailer is in use. The housing 97 of the conveyor 92 extends below the central axis of the spindles 52 as is shown in FIG. 12. The conveyor could also be a belt or chain drive, where there is a flat conveyor surface that the material falls onto and is transported down the conveyor when it moves. The belt or chain conveyor could also have flappers, fingers, or walls that catch or shovel material that may be gripped more firmly to ensure proper conveying along the conveyor.

Figure 8:
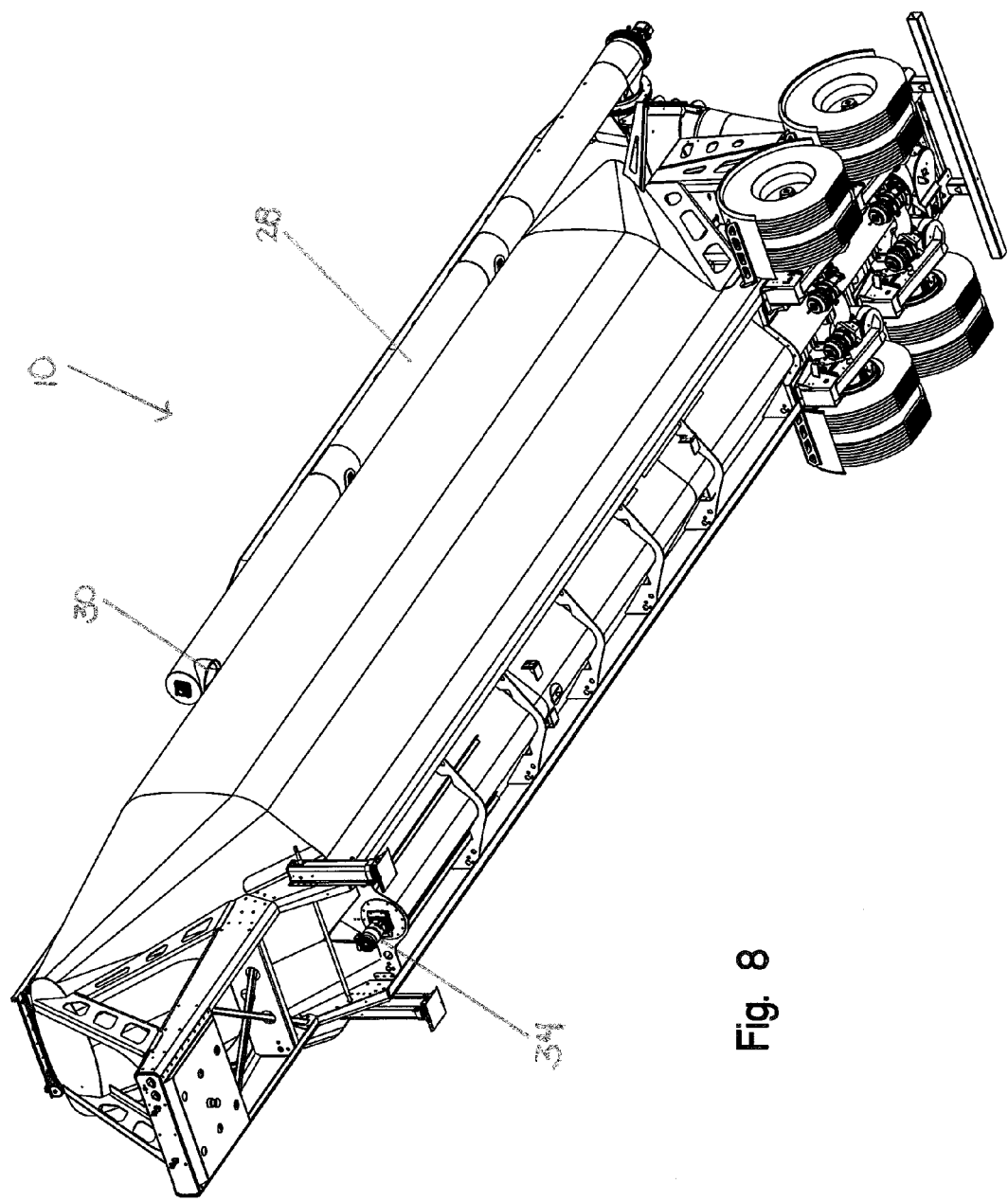
FIG. 8 is an isometric view of the underside of trailer shown in FIG. 1.
Figure 10:
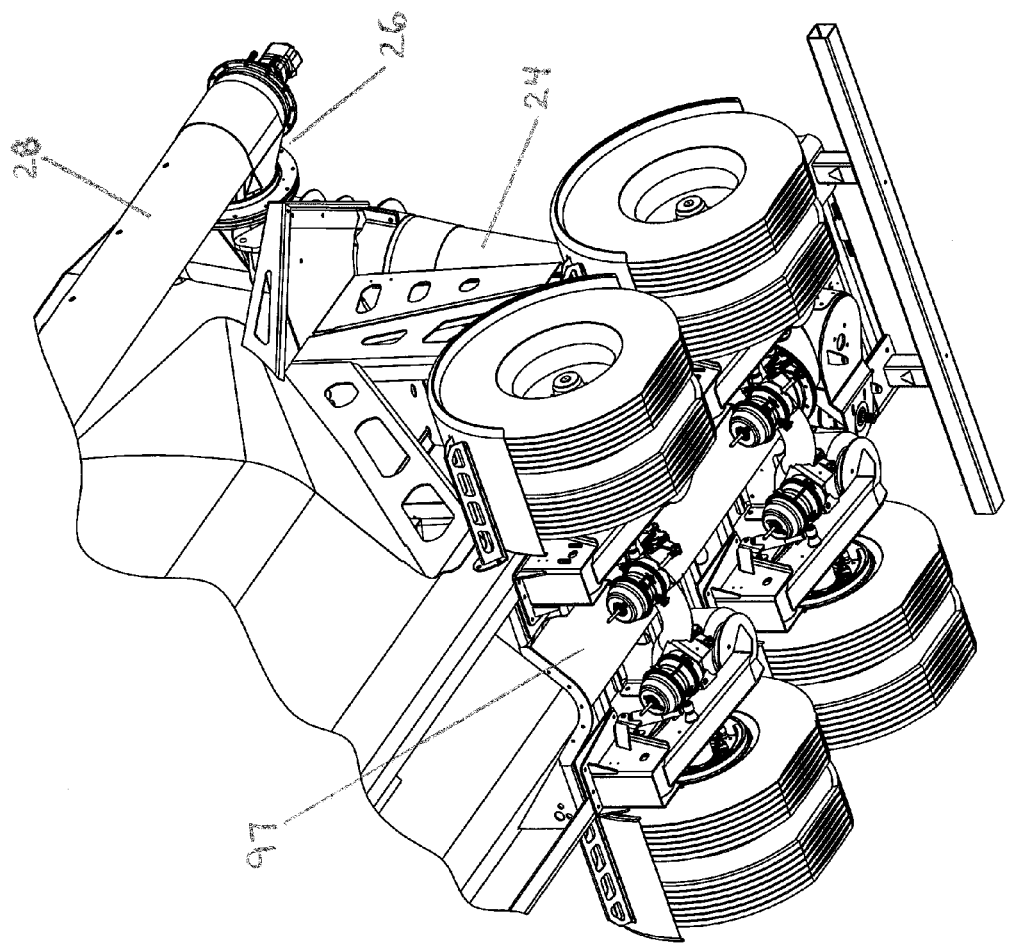
FIG. 10 is an isometric view under the rear section of the trailer.
Figure 11:
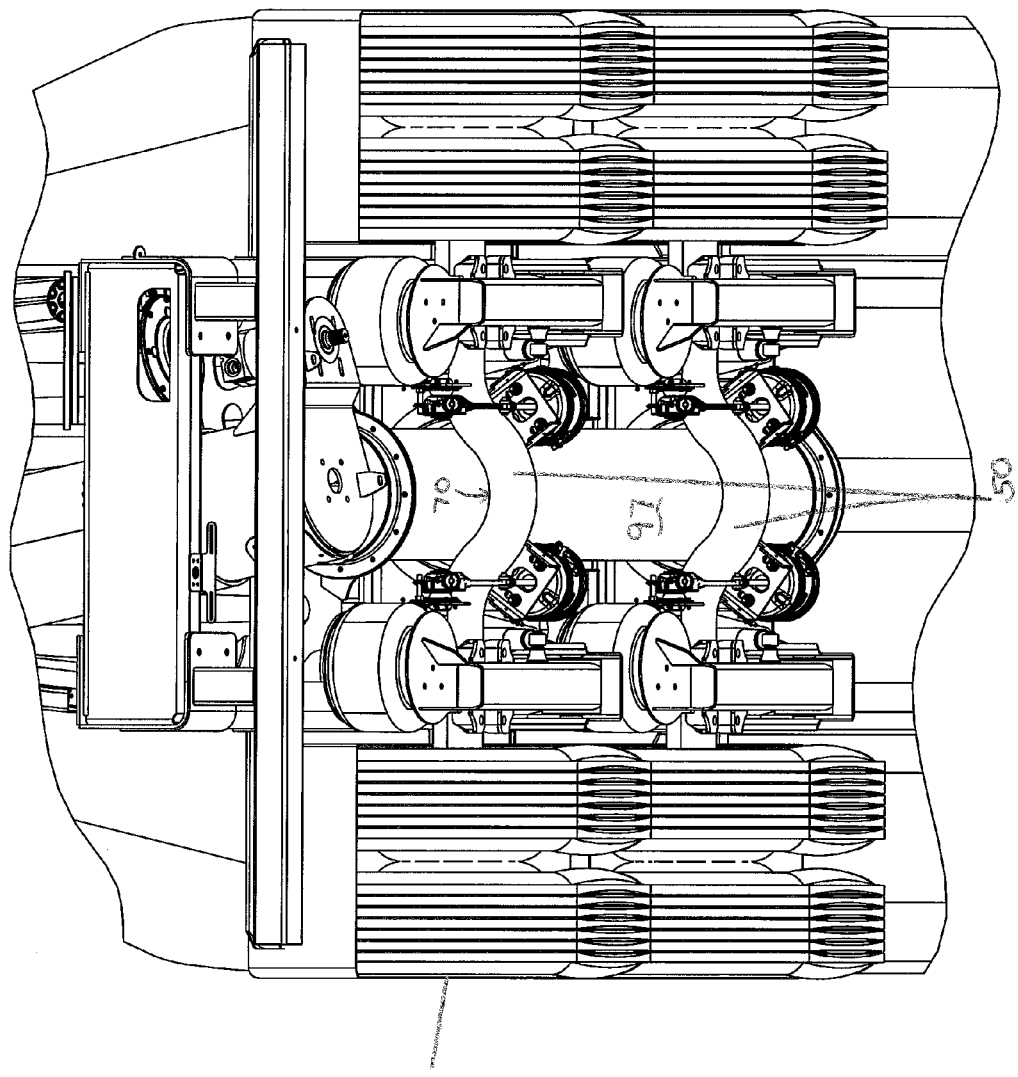
FIG. 11 is a underside view of a rear section of the trailer.

At the exit point of the bottom conveyor 105, FIG. 5, a vertical conveyor 24 is attached on one end and supported by rear frame supports 18. The other end is attached to an articulating joint 26, FIG. 10. The vertical conveyor 24 can be angled so the exit point is to one side of the trailer 10. The articulating joint 26 is then attached to an articulating arm 28 and has an exit chute 30, FIG. 8. This is commonly called a boom auger, as is well known in the art. The vertical conveyor can move material to an articulating joint 26 that then is connected to an articulating arm 28. The articulating joint allows the articulating arm 28, FIG. 8 to move from a storage cradle to various positions where the discharge of material is desired.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A trailer for storing, transporting, and dispensing loose particulate comprising:
   a gooseneck mounting portion on the front for attaching to a towing vehicle, comprising a kingpin affixed to a platform;
   an elongate frame connected to said gooseneck mounting portion, said frame having parallel frame rails and being located below said gooseneck;
   an axle mounted to said frame, said axle having spindles, said spindles having a centerline about which wheels rotate, said spindles coaxial with each other, a portion of an upper surface of said axle is located below said spindle centerlines;
   an elongate storage vessel, affixed to said frame, having a top, bottom, and sides, said top having an opening to receive particulate, said bottom being tapered toward a low central area;
   a first conveyor, having a front end located forward of said axle and rear end located rearwardly of said axle, said conveyor in communication with said low central area of said vessel for receiving particulate from said vessel, said first conveyor substantially parallel and having a portion extending below said frame rails, said first conveyor extending through the centerline of said spindles.

2. The trailer according to claim 1, and a moveable member in said low central area, said moveable member having a first and a second position, said first position allowing communication between said conveyor and said compartment, said second position preventing communication between said conveyor and said compartment.

3. The trailer according to claim 1, said storage vessel having a plurality of compartments, each compartment being separate;

a moveable member in said low central area of said separate compartment, said moveable member having a first and a second position, said first position allowing communication between said conveyor and said compartment, said second position preventing communication between said conveyor and said compartment, said compartment having an opening at the top of said separate compartment.

4. The trailer according to claim 1, wherein said frame includes parallel rails that are integral to said storage vessel.

5. The trailer according to claim 1, and a second conveyor, in communication with said first conveyor, substantially perpendicular to said first conveyor.

6. The trailer according to claim 5, and a third conveyor, having an entry point and an exit point, said entry point pivotally affixed to said second conveyor with an exit chute affixed to said exit point.

7. The trailer according to claim 1, said conveyors using an auger, comprised of a shaft, said shaft having a spiral that encircles said elongate member.

8. The trailer according to claim 1, said conveyor includes a belt.

9. The trailer according to claim 8, said belt having protrusions extending substantially perpendicular to said belt.

10. A trailer for storing, transporting, and dispensing loose particulate comprising:
- a gooseneck mounting portion on the front for attaching to a towing vehicle, comprising a kingpin affixed to a platform;
- an elongate frame connected to said gooseneck mounting portion said frame including parallel frame rails, said frame being located below said gooseneck;
- an axle mounted to said frame, said axle having spindles, said spindles having a centerline about which wheels rotate, said spindles coaxial with each other, a portion of an upper surface of said axle is located below said spindle centerlines;
- an elongate storage vessel, affixed to said frame, having a top, bottom, and sides, said top having an opening to receive particulate, said bottom being tapered toward a low central area;
- a first conveyor, having a front end located forward of said axle and rear end located rearwardly of said axle, said conveyor in communication with said low central area of said vessel for receiving particulate from said vessel, said first conveyor substantially parallel to said frame rails and having a portion extending below said frame rails, said first conveyor extending through the centerline of said spindles; and
- a moveable member in said low central area, said moveable member having a first and a second position, said first position allowing communication between said conveyor and said compartment, said second position preventing communication between said conveyor and said compartment.

11. The trailer according to claim 10, said belts having protrusions extending substantially perpendicular to said belts.

12. The trailer according to claim 10, said conveyors using an auger, comprised of a shaft, said shaft having a spiral that encircles said elongate member.

13. The trailer according to claim 10, said conveyor includes a belt.

14. The trailer according to claim 13, said belt having protrusions extending substantially perpendicular to said belt.

* * * * *